Figure 1:
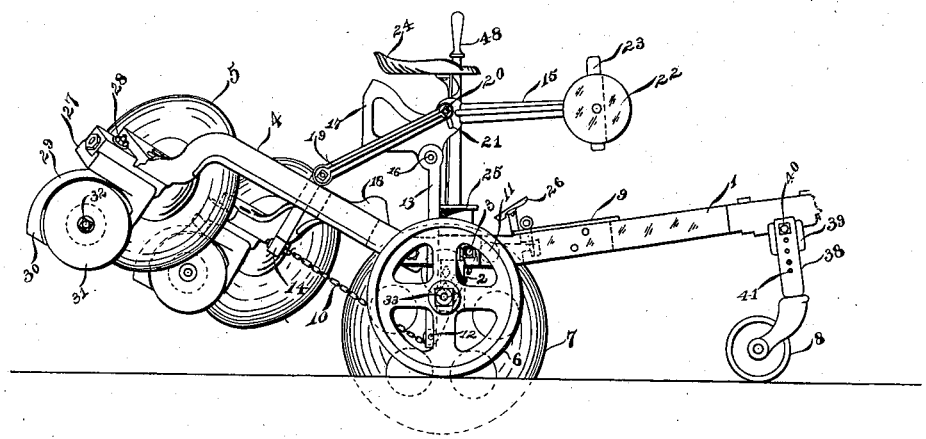

(No Model.)

2 Sheets—Sheet 1.

L. D. RAILSBACK.
ROTARY PLOW.

No. 528,511. Patented Oct. 30, 1894.

Witnesses
Albert Courtright.
Lela Monroe.

Inventor
Lafayette D. Railsback
By Attorney J. H. Lockwood (No Model.) 2 Sheets—Sheet 2.
L. D. RAILSBACK.
ROTARY PLOW.
No. 528,511. Patented Oct. 30, 1894.
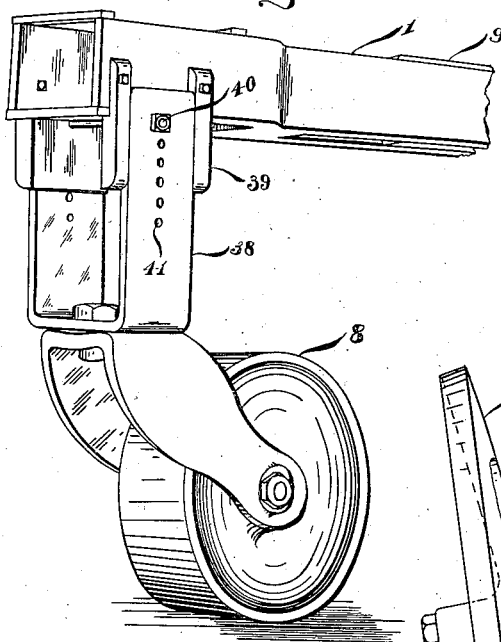
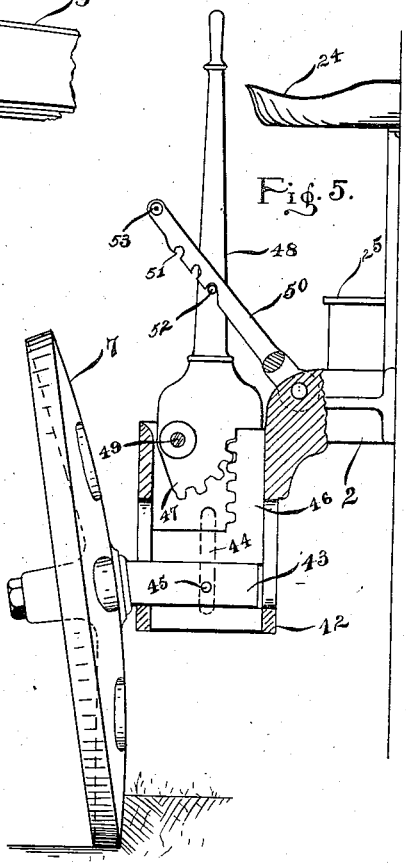
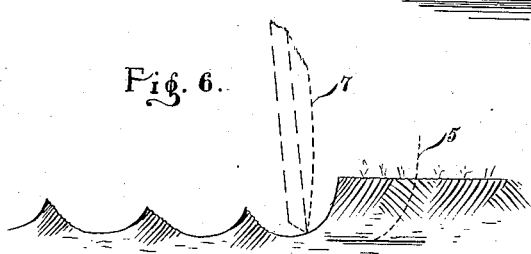
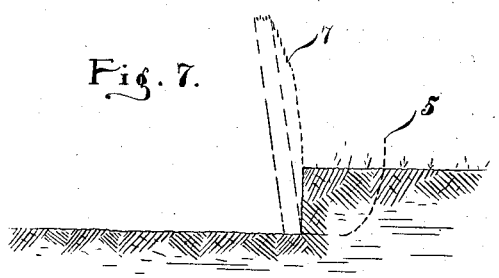
Witnesses
Albert Courtright.
Lela Monroe
Inventor
Lafayette D. Railsback
By Attorney V. H. Lockwood

UNITED STATES PATENT OFFICE.

LAFAYETTE D. RAILSBACK, OF INDIANAPOLIS, INDIANA.

ROTARY PLOW.

SPECIFICATION forming part of Letters Patent No. 528,511, dated October 30, 1894.

Application filed February 26, 1894. Serial No. 501,513. (No model.)

*To all whom it may concern:*

Be it known that I, LAFAYETTE D. RAILSBACK, of Indianapolis, county of Marion, and State of Indiana, have invented certain new and useful Improvements in Rotary Plows; and I do hereby declare that the following is a full, clear, and exact description thereof, reference being had to the accompanying drawings, in which like numerals refer to like parts.

My invention relates to rotary plows which are so constructed as to be easily handled by the plowman and avoid other imperfections found in rotary plows prior hereto.

Rotary plows heretofore have always had a strong side draft which has been a source of difficulty. It will also be observed by examining a rotary plow in operation that it will leave a furrow having no angle to it but curved or dished out as shown in Figure 6. This kind of a furrow which has always heretofore been made by rotary plows has three definite objections to it. In the first place the strong side draft in the ordinary rotary plow, due to the angle at which the disk is cutting, has heretofore been counteracted solely by the furrow wheel which will have a tendency to get out of the furrow onto the land when the side draft is exceedingly great. The side draft is increased, of course, in hard ground, and, in such case, the furrow wheel drawn laterally gradually runs up the inclined surface between the bottom and side of the previous furrow and raises the disks, nearly, if not entirely, out of the ground. This defect has been sought to be overcome by mere weight on the furrow wheel causing it to keep running nearer the bottom of the furrow. In the second place, where the inner angle of the furrow is not a right angle but is curved, there is much greater difficulty in turning the fallow inasmuch as the fallow must be turned much farther, and the third disadvantage is that when the fallow is turned, there is left between the two furrows a ridge that is not disturbed and hence not plowed. This disadvantage is very serious in hard ground. To overcome these defects in prior rotary plows, I mount behind each disk a furrow cleaner, preferably consisting of a rolling cutter followed by a small scraper to remove the dirt from the angle of the furrow. The rolling cutter takes off the lateral draft as it counteracts the push of the disk like the side bar in the old share plow. The furrow cleaner makes the inner angle of the furrow a right angle and leaves an absolutely true track or groove, as it were, for the furrow wheel to run in. The furrow wheel cannot get out of this track and hence the plow need not be more than half as heavy as heretofore. It need not weigh more than seven hundred and fifty pounds instead of fifteen hundred pounds. In fact, heretofore it has been necessary for plowmen in hard ground to weight their plows down with gravel or other ballast. By such an arrangement, too, the fallow is always easily and completely turned, thus enabling the plow to do the most thorough work.

Figure 3:
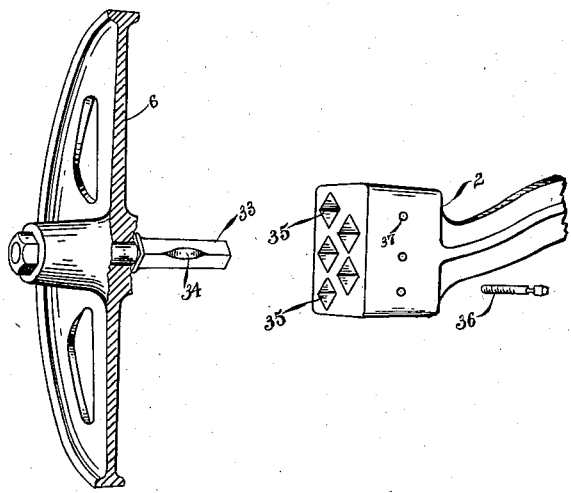

Another feature of my invention consists in the manner of mounting the land wheel. In this plow, I adjust the depth of cut by a contrivance at each end of the axle instead of in the middle. I provide the land wheel with a stub axle, diamond shaped, in cross section, adapted to fit in diamond shaped bearings in the end of the axle constructed side by side as seen in Fig. 3, whereby the wheel can be raised or lowered. The axle is held in the bearings by a suitable set screw device. Accompanying this is the manner of mounting my tongue caster wheel so that it can be raised or lowered exactly as the land wheel is raised and lowered, that is, to the same extent.

Another feature of my invention consists in the manner of adjustably mounting the furrow wheel. In the boxing at the end of the axle, I make the stub axle of the furrow wheel vertically adjustable. A vertical rack is rigidly secured to this stub axle and engages a cam shaped toothed gear or lever with an operating handle extending up near the seat. I provide also locks for holding it in place. The advantage of this construction is to enable the plowman easily to throw the plow deeper temporarily by raising the furrow wheel. This is to provide for places in the furrow that were cut shallow in the previous round by reason of stones or hard ground or other cause. Unless some provision be made for quickly altering the depth of cut, of course, the shallow cut in one furrow would be transmitted to every succeeding furrow at that point, by reason of the machine there being elevated every time a little. With my arrangement, a plowman can cut any desired depth.

These and the other features of my invention will more fully appear from the drawings and the description following.

Figure 2:
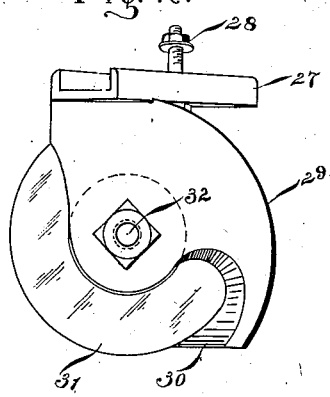

Fig. 1 is a side elevation of my plow with the disks elevated and the tongue broken away. Fig. 2 is a side elevation of my furrow cleaner. Fig. 3 is a view, slightly in perspective, of the land end of the axle and the stub axle of the land wheel. Fig. 4 is a perspective view of the mounting of my caster wheel. Fig. 5 is a side elevation of the means of mounting the furrow wheel, a portion of the casing being cut away. Fig. 6 shows the form of the furrows made by rotary plows heretofore, the loose dirt being removed and one disk and the furrow wheel being represented by dotted lines, and Fig. 7 gives the same as made by plow.

In detail 1 is the tongue of the plow to which each end of the axle 2 is securely bolted by the bolts 3. Pivoted to the rear end of the tongue is the disk carrying beam 4 on which are mounted the disks 5.

6 is the land wheel and 7 is the furrow wheel, while 8 is the tongue caster wheel. The draft is transmitted from the doubletree block 9 movable by a chain 10 over a pulley 11 mounted in the tongue and extending under the pulley 12 mounted on the lower end of the vertical frame 13 and is secured to the end of an arm 14 which is rigidly fastened to the rear part of the beam. By this construction, the draft of the team combines with the weight of the frame work draws the disks down into the ground and holds them to their work.

15 is a hand lever mounted at 16 in the vertical frame 13 and having an enlarged lower end with a heel 17 adapted to engage a lug 18 on the upper side of the disk beam 4 whereby the beam is locked down when the hand lever is elevated. In order to lift the disks, I connect beam 4 to the hand lever 15 by the links 19 which are connected by a rod 20 that operates loosely in the horizontal slot 21. By this means, the heel of the hand lever disengages its lug before the links 19 commence to draw up the beam 4.

22 is a weight mounted on the outer end of the hand lever to counterbalance the disks when the latter are elevated and assist the plowman in raising the disks. This weight 22 is adjusted on the arm 23.

24 is a seat.

25 is a tool box and 26 a foot rest.

The disks 5 are so mounted in a boxing in the beam 4 that they may be horizontally adjusted, as shown in my Letters Patent No. 505,777. Secured to the boxing on the under side is a bracket 27 held in place by a bolt 28, the bracket having on each side lugs to help hold it in place. Secured to this bracket is a peculiarly shaped casting 29, as seen in Fig. 2, whose lower rear end 30 is so beveled and formed as to make a scraper extending at about an angle of forty-five degrees to the line of the furrow and adapted to clean or scrape out the corner of the furrow the dirt cut down by the rolling cutter 31 that is mounted on the axle 32 in the casting 29. The rolling cutter 31 has two offices, namely, to prevent side draft of the plow, inasmuch as the casting 29 is rigidly mounted, and will prevent the cutter from having lateral play, and also to cut out the curved part of the furrow behind the main plow disk. The scraper 30 that follows does not touch the land side of the furrow but has only one function, that is, to scrape out the corner of the furrow after the rolling cutter has cut it down. The cutter and scraper therefore combined form the furrow cleaner and clean the furrow as heretofore described. It is preferable that the cutter be so set as to run just inside of the line of the forward edge of the plow disk so that it will cut out the corner of the furrow say about five inches high. The cutter also ought to be set somewhat lower than the scraper 30, which follows it, to prevent the point of the scraper from catching on anything, and to enable the whole device to completely cut out and remove the rounded corner of the furrow so that the furrow wheel of the plow will have a track on the next round in which to run, that it will be easier for the plow to turn the fallow and that it will prevent any ridges between the furrows.

33 is the stub axle of the land wheel being preferably diamond shaped in cross section and provided with a notch 34. I provide a series of sockets or bearings 35 in the end of the main axle of the same shape as the stub axle in which the latter snugly fits. The centers of these sockets are arranged to be about one inch from each other, some being out of line with others as shown in the drawings, whereby the land wheel can be elevated one inch, by raising its stub axle one notch.

36 is a set screw fitting in the hole 37 and engaging the notch 34 in the stub axle and holding the axle in its socket. In this connection, I mount my caster wheel on a movable frame 38 that works between jaws 39 secured to the tongue. The frame 38 is secured to the jaws 39 by the bolt 40 that fits in holes 41 in such jaws and frames. These holes are preferably one inch apart so as to agree with the sockets 35 in the land end of the main axle. The land wheel and tongue caster wheel are always set simultaneously.

42 is a casing integral with the furrow end of the main axle and in which the stub axle 43 of the furrow wheel is held and is vertically movable.

44 are vertical slots in the casing through which the pins 45 operate as guides. Integral with the stub axle 43 is a vertical rack 46 with which the cogs on the cam shaped end 47 of the lever 48 engage. This lever is mounted on the pivot 49 in the casing so that by pushing the hand lever outward at the upper end, which comes near the seat, the furrow wheel will be elevated or the plow lowered.

50 is a catch pivoted at its lower end to the axle and having notches 51 adapted to engage the pin 52 of the lever 48, whereby such lever is locked in place. At the upper end of this catch 50, I provide a handle 53, whereby the plowman can readily unlock this part of the device, and by throwing over the lever, put the disks farther into the ground. By means of these notches 51 and the rest of this part of the device, the furrow wheel can be permanently or temporarily adjusted. A temporary adjustment is desirable when the furrow wheel is running over a portion of the preceding furrow that was not plowed at its proper depth.

The advantages of my plow are clearly apparent from this description. It is easily handled, has little side draft, will thoroughly turn the fallow and will not run out of hard ground because of the curved form of the bottom and side of the furrow. It is a light plow, somewhat lighter than many of the most popular sulky plows. It also cuts a square, clean furrow, cutting to the same depth in every round.

Without limiting myself to the specific form herein shown and described, what I claim as my invention, and desire to secure by Letters Patent, is—

1. In a rotary plow, the combination with a plow disk, of a scraper mounted at an angle to the line of the furrow and behind the disk where it will square the rounded corner of the furrow, substantially as shown and described.

2. In a rotary plow, the combination with a plow disk, of a furrow cleaner comprising a rolling cutter adapted to follow the plow disk, and a scraper behind such rolling cutter set at an angle to the line of the furrow, substantially as shown and described.

3. In a rotary plow, the combination with a plow disk, of a furrow cleaner consisting of a casting rigidly mounted on the plow, a rolling cutter mounted on such casting and adapted to follow the plow disk, and a scraper formed on the lower end of such casting behind the rolling cutter extending at an angle to the line of the furrow, substantially as shown and described.

4. In a rotary plow, the combination of a main axle, a tongue, a disk beam pivoted at its front end to the framework, a pulley mounted under the framework near its center of weight, a chain extending from the disk beam near its rear end under such pulley, and means of connecting the draft to such chain, substantially as shown and described.

5. In a rotary plow, the combination of a main axle provided with a downwardly extending arm, a pulley mounted in the lower end of such arm near the center of weight of the framework, a tongue secured to the axle, a doubletree block mounted in the tongue, a disk beam pivoted at its front end to the framework, a downwardly extending arm secured to such disk beam, and a chain extending from the lower end of such arm under the pulley to the doubletree block, substantially as shown and described.

In witness whereof I have hereunto set my hand this 23d day of February, 1894.

LAFAYETTE D. RAILSBACK.

Witnesses:
   V. H. LOCKWOOD,
   WM. BOOR.